(12) United States Patent
Tanizaki et al.

(10) Patent No.: US 9,921,079 B2
(45) Date of Patent: Mar. 20, 2018

(54) TAKEOVER INFORMATION TRANSMISSION SYSTEM, TAKEOVER INFORMATION TRANSMISSION DEVICE, INFORMATION TERMINAL, TAKEOVER INFORMATION TRANSMISSION METHOD, AND TAKEOVER INFORMATION TRANSMISSION PROGRAM

(71) Applicant: TOYOTA JIDOSHA KABUSHIKI KAISHA, Toyota-shi, Aichi-Ken (JP)

(72) Inventors: Daisuke Tanizaki, Okazaki (JP); Kenta Onishi, Okazaki (JP); Motohiro Nakamura, Okazaki (JP); Kazunori Watanabe, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 15/069,486

(22) Filed: Mar. 14, 2016

(65) Prior Publication Data
US 2016/0273926 A1    Sep. 22, 2016

(30) Foreign Application Priority Data
Mar. 16, 2015   (JP) .................................. 2015-052145

(51) Int. Cl.
*G01C 21/34*   (2006.01)
*G01C 21/36*   (2006.01)

(52) U.S. Cl.
CPC ....... *G01C 21/3688* (2013.01); *G01C 21/362* (2013.01)

(58) Field of Classification Search
CPC ......... G01C 21/34; G01C 21/00; G08G 1/005
USPC .......................... 701/533, 430, 301, 532, 119
See application file for complete search history.

(56) References Cited

U.S. PATENT DOCUMENTS

| | | | | |
|---|---|---|---|---|
| 9,031,776 B2 * | 5/2015 | Goudy | .................... | G08G 1/161 701/301 |
| 2006/0106534 A1 * | 5/2006 | Kawamata | ............. | G01C 21/32 701/532 |
| 2008/0103693 A1 * | 5/2008 | Kato | ................ | G08G 1/096811 701/533 |
| 2008/0114531 A1 * | 5/2008 | Kagawa | ................. | G08G 1/163 701/119 |
| 2014/0316686 A1 * | 10/2014 | Skupin | ................. | G08G 1/0112 701/117 |
| 2015/0149080 A1 * | 5/2015 | McCarthy | ............. | G06T 15/005 701/430 |
| 2016/0061615 A1 * | 3/2016 | Takahata | ................ | G01C 21/32 701/532 |

FOREIGN PATENT DOCUMENTS

JP    2012-189438 A    10/2012

* cited by examiner

*Primary Examiner* — Tan Q Nguyen
(74) *Attorney, Agent, or Firm* — Oliff PLC

(57) ABSTRACT

A takeover information transmission system includes a takeover information acquisition unit that acquires takeover information for transferring a first travel route, on which a terminal device provides guidance, to an in-vehicle device as a second travel route on the basis of information pertaining to the first travel route, and a takeover information transmission unit that transmits the takeover information acquired by the takeover information acquisition unit to the in-vehicle device.

14 Claims, 10 Drawing Sheets

FIG. 1
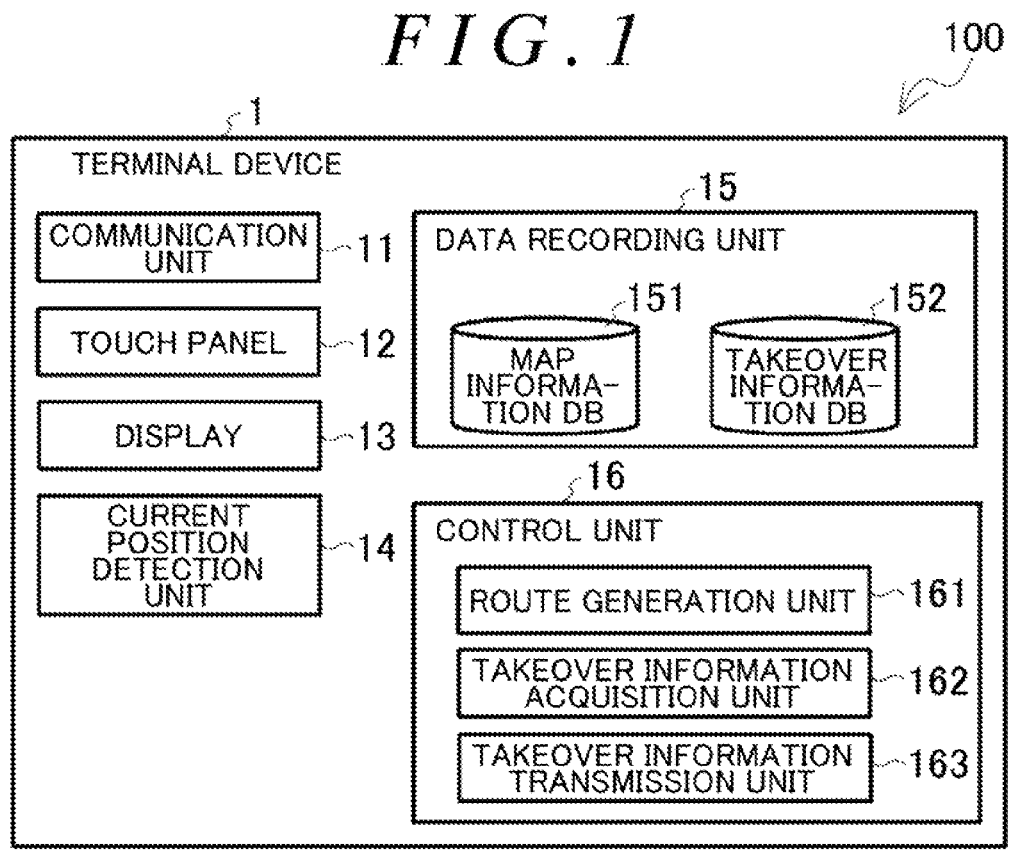
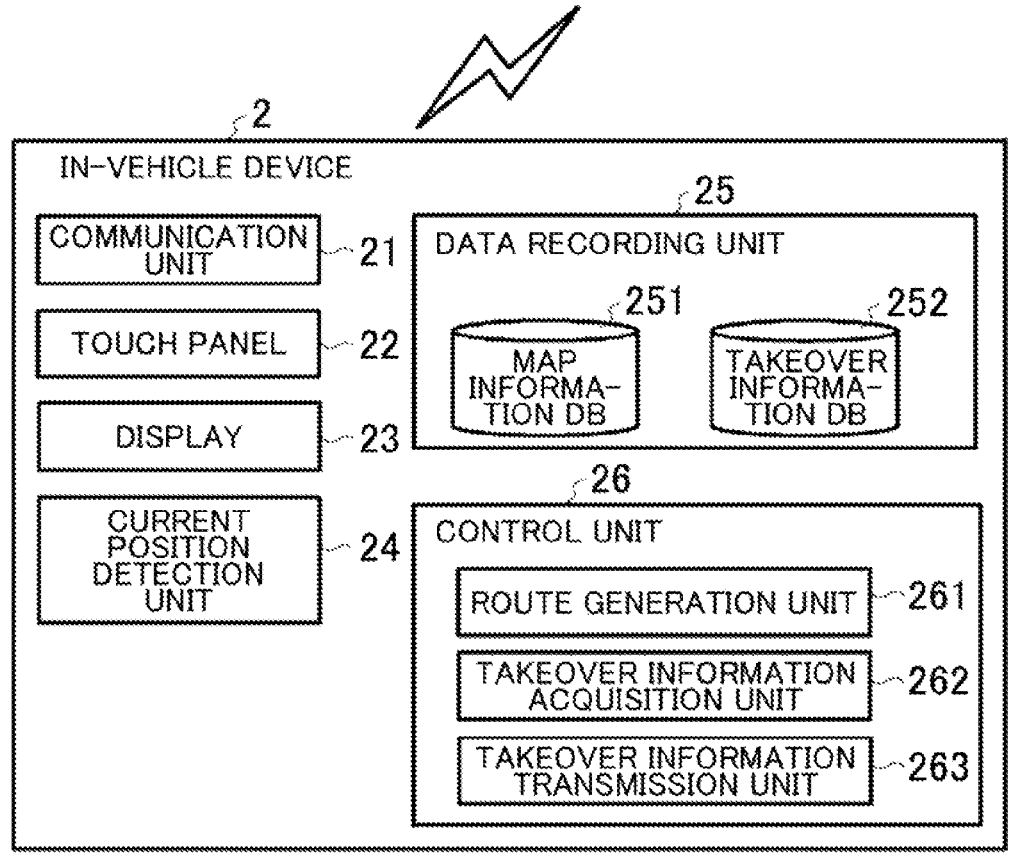

*FIG. 2*

[TAKEOVER INFORMATION]

| POSITION | APPROACH ROAD | | EXIT ROAD | |
|---|---|---|---|---|
| | ORIENTATION | TYPE | ORIENTATION | TYPE |
| 34° 56' 40", 137° 11' 45" | SOUTHWEST | ORDINARY ROAD | EAST | ORDINARY ROAD |
| 34° 57' 17", 137° 11' 23" | WEST | ORDINARY ROAD | NORTHEAST | ORDINARY ROAD |

FIG.5
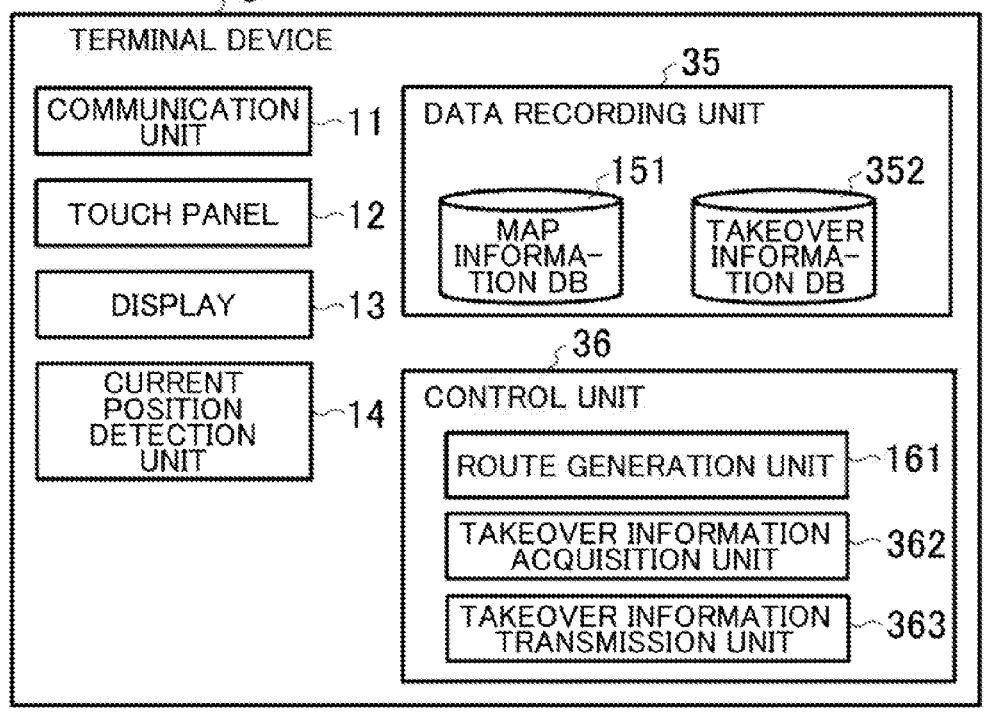
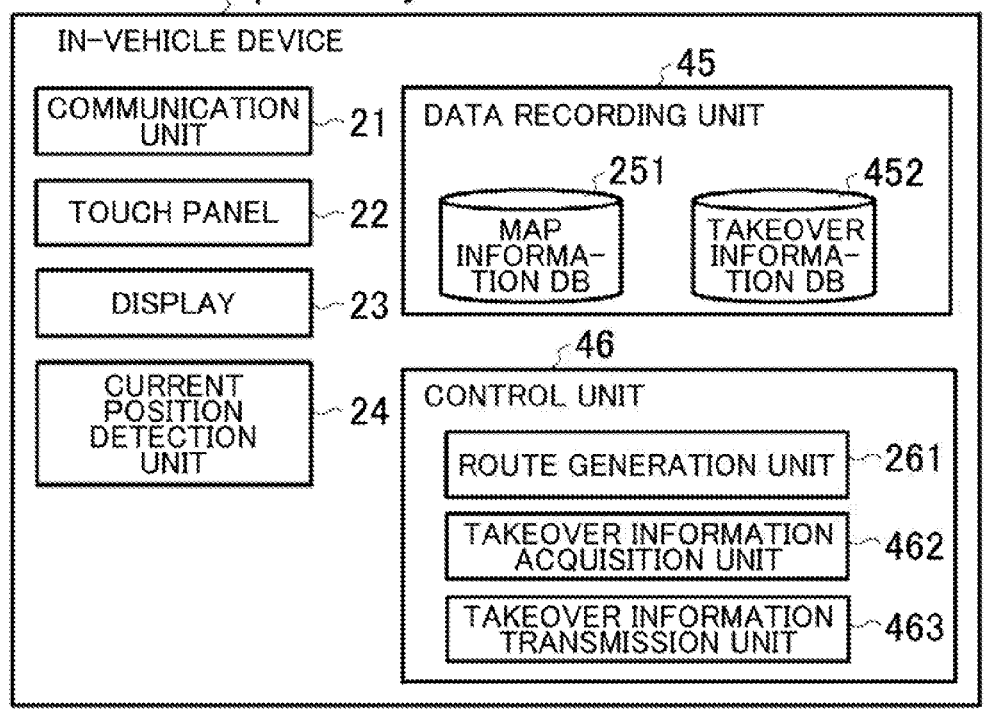

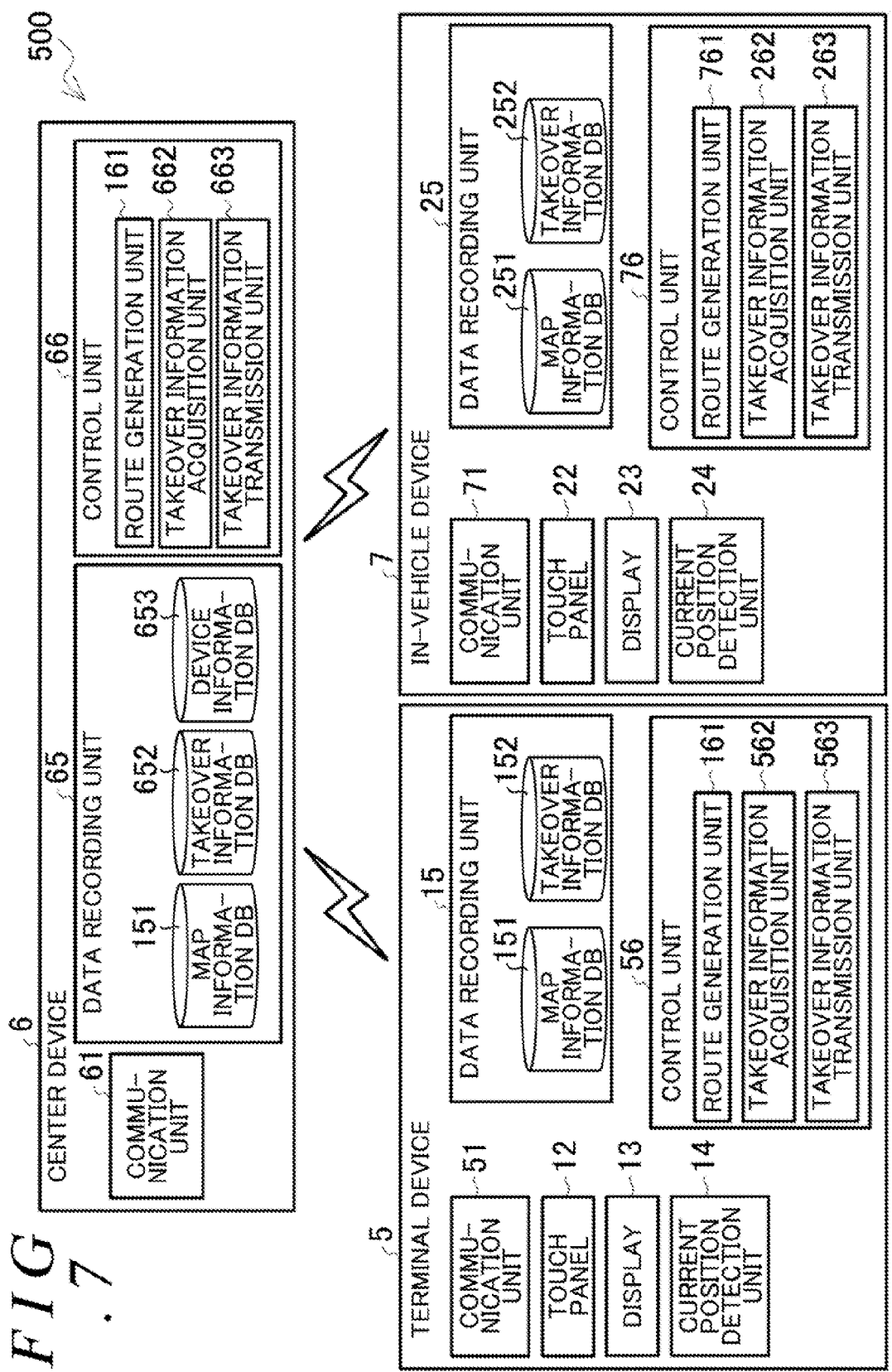

FIG. 8

[CENTER TAKEOVER INFORMATION]

| SOURCE DEVICE | DESTI-NATION DEVICE | DEPAR-TURE PLACE | DESTI-NATION | POSITION | APPROACH ROAD | | EXIT ROAD | | LINK ID |
|---|---|---|---|---|---|---|---|---|---|
| | | | | | ORIENTATION | TYPE | ORIENTATION | TYPE | |
| UID010 | UID001 | 34° 55' 43", 137° 11' 50" | 34° 56' 40", 137° 11' 50" | 34° 56' 40", 137° 11' 45" | SOUTHWEST | ORDINARY ROAD | EAST | ORDINARY ROAD | LID005. LID003. LID002. LID001. LID009. |
| | | | | 34° 57' 17", 137° 11' 23" | WEST | ORDINARY ROAD | NORTHEAST | ORDINARY ROAD | |
| UID010 | UID002 | 34° 55' 44", 137° 11' 51" | 34° 56' 40", 137° 12' 54" | 34° 56' 40", 137° 11' 45" | SOUTH | TOLL ROAD | NORTHEAST | TOLL ROAD | LID015. LID012. LID014. |
| | | | | 34° 56' 56", 137° 12' 46" | SOUTHWEST | TOLL ROAD | NORTH | TOLL ROAD | |
| | | | | 34° 57' 17", 137° 11' 23" | SOUTHEAST | TOLL ROAD | WEST | TOLL ROAD | |

FIG. 9

[DEVICE INFORMATION]

| DEVICE ID | MAP VERSION |
|---|---|
| UID001 | VER5 |
| UID002 | VER3 |
| UID010 | VER5 |

TAKEOVER INFORMATION TRANSMISSION SYSTEM, TAKEOVER INFORMATION TRANSMISSION DEVICE, INFORMATION TERMINAL, TAKEOVER INFORMATION TRANSMISSION METHOD, AND TAKEOVER INFORMATION TRANSMISSION PROGRAM

INCORPORATION BY REFERENCE

The disclosure of Japanese Patent Application No. 2015-052145 filed on Mar. 16, 2015 including the specification, drawings and abstract is incorporated herein by reference in its entirety.

BACKGROUND OF THE INVENTION

1. Field of the Invention

The invention relates to a takeover information transmission system, a takeover information transmission device, an information terminal, a takeover information transmission method, and a takeover information transmission program.

2. Description of Related Art

As one of techniques for causing mutually different devices to provide guidance on a route along which a user moves, there has been suggested a system including one device and the other device that carries out communication with the one device (see, for example, Japanese Patent Application Publication No. 2012-189438 (JP 2012-189438 A)). In this system, in order for the other device to provide guidance on a route on which the one device has been providing guidance, route information that is being utilized in the one device is transmitted to the other device.

However, in JP 2012-189438 A, only route information is simply transmitted from the one device to the other device, so there is a possibility that the reproducibility of a route on which the one device has been providing guidance as a route in the other device decreases. For example, if the version of map information that is used to generate a route is different between the one device and the other device, even when the other device generates a route by using the route information received from the one device, the other device is not able to generate the same route as the route generated by the one device. For this reason, there is a possibility that a decrease in the reproducibility of a route becomes remarkable. Therefore, as for the technique described in JP 2012-189438 A, there is room for improvement from the viewpoint of the convenience of a user in providing guidance on corresponding routes by using mutually different devices.

SUMMARY OF THE INVENTION

The invention provides a takeover information transmission system, a takeover information transmission device, an information terminal, a takeover information transmission method and a takeover information transmission program that are able to improve the convenience of a user in providing route guidance by transferring a route on which a first terminal provides guidance, to a second terminal.

A takeover information transmission system according to the invention includes a takeover information acquisition portion configured to acquire takeover information for transferring a route, on which a first terminal provides guidance, to a second terminal different from the first terminal on the basis of route information pertaining to the route, and a takeover information transmission portion configured to transmit the takeover information acquired by the takeover information acquisition means.

A takeover information transmission device according to the invention includes a takeover information acquisition portion configured to acquire takeover information for transferring a route, on which a first terminal provides guidance, to a second terminal different from the first terminal on the basis of route information pertaining to the route, and a takeover information transmission portion configured to transmit the takeover information acquired by the takeover information acquisition means to the second terminal.

An information terminal according to the invention includes a takeover information acquisition portion configured to acquire takeover information for transferring a route, on which the information terminal provides guidance, to a different information terminal on the basis of route information pertaining to the route, and a takeover information transmission portion configured to transmit the takeover information acquired by the takeover information acquisition means to the different information terminal.

A takeover information transmission method according to the invention includes acquiring, by a takeover information acquisition portion, takeover information for transferring a route, on which a first terminal provides guidance, to a second terminal different from the first terminal on the basis of route information pertaining to the route, and transmitting, by a takeover information transmission portion, the acquired takeover information.

A non-transitory computer-readable recording medium storing a takeover information transmission program for causing a computer to execute instructions. The instructions include acquiring takeover information for transferring a route, on which a first terminal provides guidance, to a second terminal different from the first terminal on the basis of route information pertaining to the route, and transmitting the acquired takeover information.

A takeover information transmission system according to the invention includes a first terminal configured to store first map information, set a first route in a map contained in the first map information, and transmit the first route to an external device; and a second terminal configured to store second map information, receive the first route that is transmitted from the first terminal, set a second route in a map contained in second map information, and display the second route, wherein the first terminal is configured to generate takeover information for generating the second route, and transmit the generated second route to an external device, and the second terminal is configured to receive the takeover information, and set the second route on the basis of the first route and the takeover information.

With the takeover information transmission system, the takeover information transmission device, the information terminal, the takeover information transmission method and the takeover information transmission program according to the invention, the takeover information for causing the second terminal to provide guidance on a route corresponding to the above-described route is acquired on the basis of the route information pertaining to the route on which the first terminal provides guidance. Therefore, for example, even when the versions of pieces of map information that are respectively used by the first terminal and the second terminal are different from each other, it is possible to transfer the route, on which the first terminal provides guidance, to the second terminal by using the takeover information. Thus, it is possible to improve the convenience of a user for providing guidance on a route.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a block diagram that illustrates a terminal device and an in-vehicle device according to a first embodiment of the invention;

FIG. 2 is a view that illustrates takeover information;

FIG. 5 is a block diagram that illustrates a terminal device and an in-vehicle device according to a second embodiment;

FIG. 7 is a block diagram that illustrates a terminal device, a center device and an in-vehicle device according to a third embodiment;

FIG. 8 is a view that illustrates center takeover information;

FIG. 9 is a view that illustrates device information; and

DETAILED DESCRIPTION OF EMBODIMENTS

Figure 3:
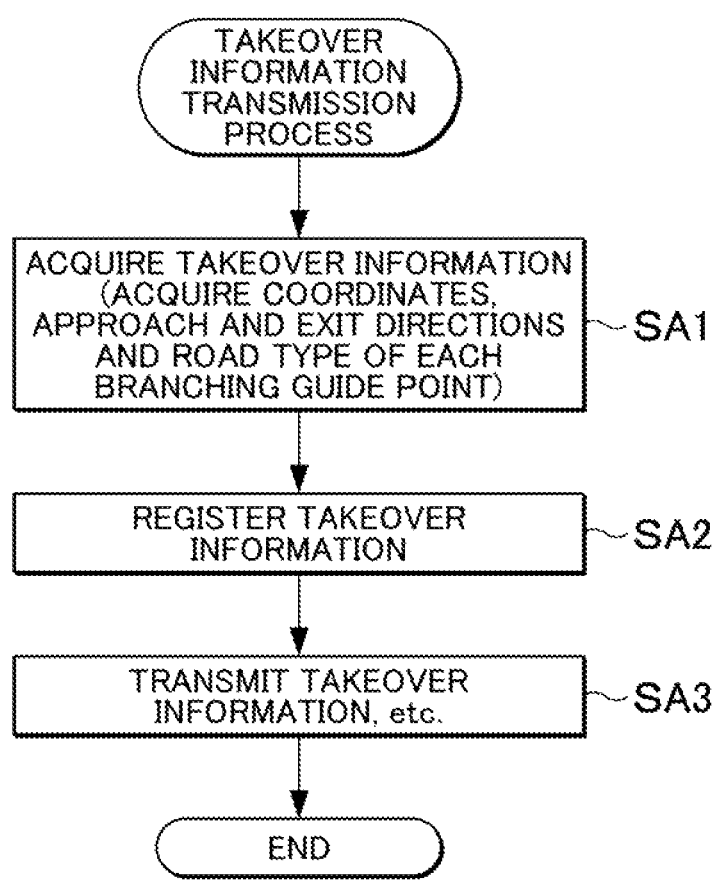
FIG. 3 is a flowchart of a takeover information transmission process.

Hereinafter, embodiments of a takeover information transmission system, takeover information transmission device, information terminal, takeover information transmission method and takeover information transmission program according to the invention will be described in detail with reference to the accompanying drawings. However, the invention is not limited by the embodiments.

The takeover information transmission system according to the invention is a system to transmit takeover information for transferring a route, on which a first terminal provides guidance, to a second terminal on the basis of route information pertaining to the route. Examples of the operation of this takeover information transmission system include the case where a first terminal acquires takeover information and then the first terminal transmits the acquired takeover information to a second terminal and the case where a device different from a first terminal acquires takeover information and then the different device transmits the acquired takeover information to a second terminal.

The first terminal is a device that provides guidance on a route, and is a takeover source device from which a travel route of a vehicle is transferred. The first terminal is specifically a concept including an in-vehicle device, a terminal device, and the like. The travel route is a concept including a route along which the vehicle should travel. The in-vehicle device is a device that is mounted on the vehicle and is specifically a concept including an in-vehicle navigation device. The terminal device is a device on which a predetermined computer is mounted and is specifically a concept including a smartphone and a portable navigation device.

The second terminal is a device that provides guidance on a route corresponding to a route on which the first terminal provides guidance and is a takeover destination device to which a travel route of the vehicle is transferred. The second terminal is specifically a concept including an in-vehicle device, a terminal device, and the like.

The takeover information is information for transferring a route, on which the first terminal provides guidance, to the second terminal. The takeover information is not the entire information that identifies all the route on which the first terminal provides guidance but information (that is, information of only part of the above-described information that identifies all the route) by which the route is allowed to be identified (that is, reproduced) even between different models (that is, for example, between the first terminal and the second terminal). Specific information included in the takeover information is any information as long as the information is not the entire information that identifies all the route on which the first terminal provides guidance. Examples of the specific information include information that identifies a branching guide point, information that identifies an approach direction to or exit direction from the branching guide point, information that identifies an intersection, information that identifies an approach direction to or exit direction from the intersection, information that identifies a road type, link identification information, information that identifies a route generation condition, information that identifies the version of map information, and the like. The details of these pieces of information will be described in the embodiments. Transmission of takeover information may be transmission of all these pieces of information or transmission of only part of these pieces of information. In the case where only part of these pieces of information are transmitted, any technique may be used as a determination method of determining the part of information to be transmitted. Examples of the technique include a technique for determining the part of information to be transmitted on the basis of the version of map information in the first terminal and the version of map information in the second terminal and a technique for determining the part of information to be transmitted on the basis of the function of the first terminal for providing guidance on a route and the function of the second terminal for providing guidance on a route.

In the first to third embodiments described below, the first terminal is referred to as takeover source device, the second terminal is referred to as takeover destination device, the route on which the first terminal provides guidance is referred to as first travel route, the route that corresponds to the route on which the first terminal provides guidance and on which the second terminal provides guidance is referred to as second travel route, and a generation source device that generates the first travel route is referred to as generation source device. Specifically, as for the first to third embodiments, the case where takeover information is transmitted in the case where the terminal device functions as both the generation source device and the takeover source device and the in-vehicle device functions as the takeover destination device will be described. More specifically, as for the first embodiment, the case where the terminal device transmits information that identifies branching guide points, information that identifies an approach direction to or exit direction from each branching guide point, and information that identifies road types as the takeover information. More specifically, as for the second embodiment, the case where the terminal device transmits information that identifies intersections, information that identifies an approach direction to or exit direction from each intersection and information that identifies road types as the takeover information will be described. More specifically, as for the third embodiment, the case where the center device that is different from the terminal device or the in-vehicle device transmits information that identifies branching guide points, information that identifies an approach direction to or exit direction from each branching guide point and information that identifies road types, or link identification information, as the takeover information on the basis of the version of map information in the terminal device and the version of map information in the in-vehicle device will be described. The remaining pieces of the takeover information, other than the pieces of the takeover information that will be described in the first to third embodiments and the operation of transmitting the takeover information on the basis of the function of the first terminal for providing guidance on a route and the function of the second terminal for providing guidance on a route will be described in alternative embodiments.

First Embodiment

Initially, the first embodiment will be described. In this embodiment, the case where a travel route generated in the terminal device is transferred to the in-vehicle device by using the takeover information, such as information that identifies branching guide points, information that identifies an approach direction to or exit direction from each branching guide point and information that identifies road types will be mainly described. Instead, a travel route generated in the in-vehicle device may be transferred to the terminal device by using the takeover information. Hereinafter, the vehicle on which the in-vehicle device is mounted (the vehicle in which a user who operates the in-vehicle device is riding) is referred to as host vehicle. The host vehicle is, for example, a concept including a four-wheeled vehicle, a two-wheeled vehicle, a bicycle, and the like. Hereinafter, the case where the host vehicle is a four-wheeled vehicle will be described. The functions of the in-vehicle device in the takeover information transmission system are allowed to be obtained through a similar configuration to that of a known in-vehicle navigation device except a specific portion, so the description thereof is omitted.

Configuration

Initially, the configurations of a terminal device 1 and in-vehicle device 2 that function as a takeover information transmission system 100 according to the present embodiment will be described. FIG. 1 is a block diagram that illustrates the terminal device and the in-vehicle device according to the embodiment of the invention.

Configuration—Terminal Device

First, the configuration of the terminal device 1 will be described. As shown in FIG. 1, the terminal device 1 is an information terminal or a takeover information transmission device. The terminal device 1 roughly includes a communication unit 11, a touch panel 12, a display 13, a current position detection unit 14, a data recording unit 15 and a control unit 16.

Configuration—Terminal Device—Communication Unit

The communication unit 11 is a communication means that carries out communication with the in-vehicle device 2 via a network. Although the specific type and configuration of the communication unit 11 are selected, for example, a known mobile unit wireless communication means or near field communication means may be used.

Configuration—Terminal Device—Touch Panel

The touch panel 12 is an operating means that receives the input of various operations from a user as a result of depression with user's finger, or the like. The touch panel 12 is transparent or translucent, and is provided so as to be superimposed on the display face of the display 13 on the front face of the display 13. A known touch panel including an operating position detection means of a resistance membrane type, an electrostatic capacitance type, or the like, may be used as the touch panel 10.

Configuration—Terminal Device—Display

The display 13 is a display means that displays various images under control of the control unit 16 (described later). Particularly, the display 13 is a display means that displays a map on the basis of map information stored in a map information database 151 (hereinafter, database is referred to as DB) (described later). The specific configuration of the display 13 is selected. For example, a flat panel display, such as a known liquid crystal display and an organic EL display, may be used as the display 13.

Configuration—Terminal Device—Current Position Detection Unit

The current position detection unit 14 is a current position detection means that detects the current position of the terminal device 1. The current position detection unit 14 includes a GPS or geomagnetism sensor (both are not shown), and detects the current position (coordinates), orientation, and the like, of the terminal device 1 with a known method.

Configuration—Terminal Device—Data Recording Unit

The data recording unit 15 is a recording means that records programs and various data that are required to operate the terminal device 1, and is, for example, formed of a hard disk (not shown) as an external recording device. However, instead of the hard disk or in addition to the hard disk, any other recording medium, including a magnetic recording medium, such as a magnetic disk, or an optical recording medium, such as a DVD and a Blu-ray Disc, may be used (this also applies to a data recording unit 25 (described later), data recording units 35, 45 according to the second embodiment and a data recording unit 65 according to the third embodiment).

The data recording unit 15 includes the map information DB 151 and a takeover information DB 152.

The map information DB 151 is a map information storage means that stores map information. The map information is information that is required to identify various positions including roads, intersections of roads, road structures, facilities, and the like. The map information, for example, includes node data (for example, a node ID, coordinates, and the like) pertaining to each of nodes set on roads, link data (for example, a link ID, a link name, a connection node ID, road coordinates, a road type (for example, a toll road, an ordinary road, an elevated road, or the like), the number of lanes, and the like) pertaining to each of links set on roads, object data (for example, a traffic light, a road sign, a guard rail, a facility, or the like), terrain data, and the like.

The takeover information DB 152 is a takeover information storage means that stores takeover information. The takeover information is information for transferring a first travel route to the in-vehicle device 2 as a second travel route, and is information including information of only part of the entire information that identifies all the first travel route. The takeover information is, for example, information that identifies branching guide points, information that identifies an approach direction to or exit direction from each branching guide point, information that identifies road types, and the like. The branching guide point is a branching point at which guidance should be provided among branching points in the first travel route. The branching guide point is specifically a branching point at which the traveling direction of the host vehicle changes and guidance, such as right turn or left turn, is provided among the branching points in the first travel route. The branching point is a point at which a road is branching in the first travel route. The branching point specifically includes an intersection and a point at which a road branches, other than an intersection, and includes a point at which one road branches into multiple roads in the traveling direction. FIG. 2 is a view that illustrates takeover information. As shown in FIG. 2, the takeover information is, for example, configured such that the item "POSITION", the item "APPROACH ROAD" and the item "EXIT ROAD" are associated with pieces of information corresponding to the items. Information corresponding to the item "POSITION" is information that identifies the position of a branching guide point (in FIG. 2, latitude and longitude coordinates, for example, 34°56'40", 137°11'45", and the like). Each of the item "APPROACH ROAD" and the item "EXIT ROAD" further includes the item "ORIENTATION" and the item "TYPE". Information corresponding to the item "ORIENTATION" of the item "APPROACH ROAD" is information that identifies the orientation (approach direction) in which an approach road extends to a corresponding branching guide point with reference to the branching guide point (in FIG. 2, octas, for example, southwest, or the like). The approach road is a road on which the host vehicle travels just before traveling through a branching guide point when the host vehicle approaches to the branching guide point along a travel route. Information corresponding to the item "TYPE" of the item "APPROACH ROAD" is information that identifies the road type of an approach road (in FIG. 2, for example, ordinary road). The information corresponding to the item "TYPE" of the item "APPROACH ROAD" may include a toll road, an elevated road, or the like, other than ordinary road in FIG. 2, in response to a travel route (the same applies to information corresponding to the item "TYPE" of the item "EXIT ROAD" (described later)). Information corresponding to the item "ORIENTATION" of the item "EXIT ROAD" is information that identifies the orientation (exit direction) in which an exit road extends to a corresponding branching guide point with reference to the branching guide point (in FIG. 2, octas, for example, east, or the like). The exit road is a road on which the host vehicle travels just after traveling a branching guide point when the host vehicle exits from the branching guide point along a travel route. Information corresponding to the item "TYPE" of the item "EXIT ROAD" is information that identifies the road type of an exit road (in FIG. 2, for example, ordinary road). Such takeover information in the takeover information DB 152 is recorded in a takeover information transmission process (described later).

Configuration—Terminal Device—Control Unit

Referring back to FIG. 1, the control unit 16 is a control means that controls the terminal device 1. The control unit 16 is specifically a computer including a CPU, various programs and an internal memory, such as a RAM. The various programs (including a basic control program, such as OS, and application programs that are launched on the OS to implement specific functions) are interpreted on the CPU. The RAM is used to store programs and various data. Particularly, the takeover information transmission program according to the first embodiment substantially constitutes the units of the control unit 16 when installed in the terminal device 1 via a selected recording medium or network (the same applies to a control unit 26, control units 36, 46 according to the second embodiment, and control units 56, 66, 76 according to the third embodiment).

The control unit 16 functionally conceptually includes a route generation unit 161, a takeover information acquisition unit 162 and a takeover information transmission unit 163.

The route generation unit 161 is a route generation means that generates a first travel route from a departure place to a destination on the basis of the map information in the map information DB 151 with a known generation technique. The departure place is a point at which the vehicle starts moving. The departure place is, for example, set upon reception of user's predetermined operation via the touch panel 12 or set to a current position detected by the current position detection unit 14 or a current position detection unit 24 of the in-vehicle device 2 (described later). The destination is a point to which the vehicle moves. The destination is, for example, set upon reception of user's predetermined operation via the touch panel 12. The takeover information acquisition unit 162 is a takeover information acquisition means that acquires takeover information for transferring a first travel route, on which the terminal device 1 provides guidance, to the in-vehicle device 2 different from the terminal device 1 as a second travel route on the basis of information pertaining to the first travel route. The takeover information transmission unit 163 is a takeover information transmission means that transmits takeover information acquired by the takeover information acquisition unit 162. Processes that are executed by these units of the control unit 16 will be described later.

Configuration—in-Vehicle Device

Next, the configuration of the in-vehicle device 2 will be described. As shown in FIG. 1, the in-vehicle device 2 is an information terminal or a takeover information transmission device. The in-vehicle device 2 roughly includes a communication unit 21, a touch panel 22, a display 23, the current position detection unit 24, the data recording unit 25 and the control unit 26.

Configuration—in-Vehicle Device—Communication Unit

The communication unit 21 is a communication means that carries out communication with the terminal device 1 via a network. The specific configuration of the communication unit 21 is similar to the configuration of the communication unit 11.

Configuration—in-Vehicle Device—Touch Panel

The touch panel 22 is an operation means that receives the input of various operations from a user. The specific configuration of the touch panel 22 is similar to the configuration of the touch panel 12.

Configuration—in-Vehicle Device—Display

The display 23 is a display means that displays various images under control of the control unit 26 (described later). The specific configuration of the display 23 is similar to the configuration of the display 13.

Configuration—in-Vehicle Device—Current Position Detection Unit

The current position detection unit 24 is a current position detection means that detects the current position of the in-vehicle device 2. The specific configuration of the current position detection unit 24 is similar to the configuration of the current position detection unit 14.

Configuration—in-Vehicle Device—Data Recording Unit

The data recording unit 25 includes a map information DB 251 and a takeover information DB 252. The configuration of each of the pieces of information is similar to the configuration of each of the pieces of information in the data recording unit 15.

Configuration—in-Vehicle Device—Control Unit

Referring back to FIG. 1, the control unit 26 functionally conceptually includes a route generation unit 261, a takeover information acquisition unit 262 and a takeover information transmission unit 263. The configuration of each of these units is similar to the configuration of each of the same-name units of the control unit 16.

Process

Figure 4:
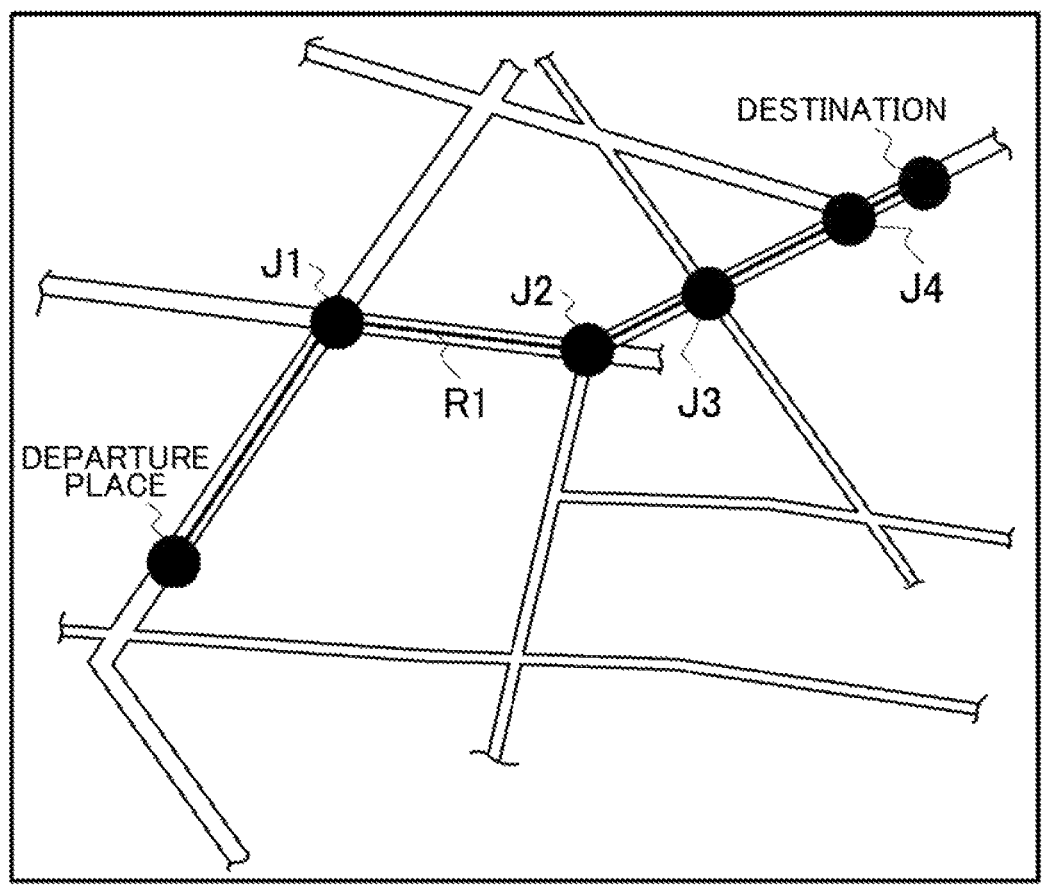
FIG. 4 is a view that shows an example of a first travel route.

Next, the takeover information transmission process that is executed by the terminal device 1 of the thus configured takeover information transmission system 100 will be described. FIG. 3 is a flowchart of the takeover information transmission process (in the following description of the processes, step is abbreviated as "S"). FIG. 4 is a view that shows an example of the first travel route. The takeover information transmission process is roughly a process of acquiring takeover information and transmitting the acquired takeover information. The timing at which the takeover information transmission process is executed is any timing after the route generation unit 261 of the terminal device 1 has generated a first travel route. For example, it is assumed that, after the route generation unit 261 of the terminal device 1 has generated a first travel route R1, the input of operation to transmit takeover information to the in-vehicle device 2 is performed via the touch panel 12, and then the takeover information transmission process is executed. The description will be made from when the process is started.

Initially, as shown in FIG. 3, in SA1, the takeover information acquisition unit 162 of the terminal device 1 acquires the takeover information. Specifically, branching guide points in the first travel route generated by the route generation unit 261 are identified, then the position of each of the identified branching guide points, the orientation of each of the approach road to and exit road from each of the identified branching guide points and the road type of each of the approach road and the exit road of each branching guide point (hereinafter, matters pertaining to each branching guide point) are identified, and these identified results are acquired as the takeover information. More specifically, in acquiring the takeover information, initially, the takeover information acquisition unit 162 identifies the branching point closest to the departure place in the first travel route, and determines whether the identified branching point is a branching guide point. Subsequently, when it is determined that the closest branching point is a branching guide point, the above-described matters pertaining to the branching guide point are identified for this branching point, and the identified results are acquired as the takeover information. On the other hand, when it is determined that the closest branching point is not a branching guide point, matters pertaining to the branching guide point are not identified for this branching point. These processes are sequentially executed from the departure place side toward the destination side until the vehicle reaches the branching point closest to the destination. Any technique may be used as a technique for identifying branching points, a technique for determining whether a branching point is a branching guide point and a technique for identifying matters pertaining to a branching guide point. For example, a known technique for identification by using link data and node data may be used. For example, the positions of branching points J1, J2 among branching points J1 to J4 in FIG. 4 are identified as the positions of branching guide points, the orientation of the approach road to the branching point J1 is identified as southwest, the orientation of the exit road from the branching point J1 is identified as east, the orientation of the approach road to the branching point J2 is identified as west, the orientation of the exit road from the branching point J2 is identified as northeast, and the road type of each of the approach roads to the branching points J1, J2 and the road type of each of the exit roads from the branching points J1, J2 are identified as ordinary road.

Referring back to FIG. 3, in SA2, the takeover information acquisition unit 162 of the terminal device 1 registers the takeover information. Specifically, the takeover information acquired in SA1 is stored in the takeover information DB 152 for registration. For example, the takeover information shown in FIG. 2 is stored in the takeover information DB 152 for registration.

Referring back to FIG. 3, in SA3, the takeover information transmission unit 163 of the terminal device 1 transmits the takeover information, and the like. Specifically, the takeover information registered in SA2 and generation information are transmitted to the in-vehicle device 2 via the communication unit 11 shown in FIG. 1. The generation information is information for generating a second travel route. The generation information is specifically information that is used together with the takeover information as information for generating the second travel route. The generation information, for example, includes information that identifies the departure place and destination of the first travel route. After SA3, the takeover information transmission process ends.

On the other hand, the in-vehicle device 2 that has received the takeover information and the generation information, transmitted in SA3, generates the second travel route on the basis of the received these pieces of information and the map information in the map information DB 251, and provides guidance by displaying the generated second travel route on the display 23. Specifically, in generating the second travel route, the route generation unit 261 of the in-vehicle device 2 sets the departure place and destination that are identified by the generation information as the departure place and destination of the second travel route, and generates the second travel route that reflects the takeover information. Generating the second travel route that reflects the takeover information is to search for a second travel route such that coincidence between each of the road types, the positions of the branching guide points, the orientations of the approach roads and the orientations of the exit roads, which are identified by the takeover information, and each of the road types, the positions of the branching guide points, the orientations of the approach roads and the orientations of the exit roads in the second travel route is maximum. For example, the route generation unit 261 of the in-vehicle device 2 initially searches for a travel route such that the number of branching guide points that coincide between the takeover information and a found travel route is as large as possible. The branching guide point that coincides between the takeover information and the found travel route is a branching guide point at which the position on a map, the orientation of the approach road and the orientation of the exit road all coincide between the takeover information and the found travel route. Subsequently, when the number of the found travel routes is only one, the route generation unit 261 sets the only one travel route for the second travel route. On the other hand, when the number of the generated travel routes is multiple, the route generation unit 261 selects the travel route by which the number of coincidences between the road types identified by each of the plurality of travel routes and the road types identified by the takeover information is maximum from among the plurality of travel routes, and sets the selected travel route for the second travel route. When there are a plurality of the selected travel routes, the route generation unit 261 may set only one travel route out of the plurality of selected travel routes for the second travel route by using a known technique (for example, a technique for searching for only one route in accordance with a search condition, such as distance priority or time priority, set by a user). In this way, the second travel route is generated while reflecting the takeover information, so it is possible to improve the coincidence between the first travel route and the second travel route (that is, the reproducibility of the first travel route as the second travel route).

Advantageous Effects of First Embodiment

In this way, according to the present embodiment, the takeover information acquisition unit 162 acquires the takeover information for causing the in-vehicle device 2 to provide guidance on the second travel route on the basis of the first travel route on which the terminal device 1 provides guidance. Therefore, for example, even when the version of the map information that is used by the terminal device 1 differs from the version of the map information that is used by the in-vehicle device 2, it is possible to transfer the first travel route to the in-vehicle device 2 as the second travel route by using the takeover information, so it is possible to improve the convenience of a user in providing guidance on a route.

For example, it is possible to reduce the information content of the takeover information by using the information that identifies branching guide points as the takeover information, so it is possible to quickly provide guidance on the second travel route by shortening a transmission time that is taken by the terminal device 1 to transmit the takeover information to the in-vehicle device 2.

For example, by using the information that identifies the orientation in which the approach road extends to each branching guide point or the orientation in which the exit road extends from each branching guide point as the takeover information, it is possible to reflect the information that identifies the orientation in which the approach road extends to each branching guide point or the orientation in which the exit road extends from each branching guide point. Therefore, it is possible to improve the reproducibility of the first travel route on which the terminal device 1 provides guidance as the second travel route in the in-vehicle device 2.

For example, it is possible to reflect the information that identifies the road types by using the information that identifies the road types as the takeover information, so it is possible to improve the reproducibility of the first travel route on which the terminal device 1 provides guidance as the second travel route in the in-vehicle device 2.

Second Embodiment

Next, the second embodiment will be described. In this embodiment, the case where a travel route generated in a terminal device is transferred to an in-vehicle device by using takeover information, such as information that identifies intersections, information that identifies an approach direction to or an exit direction from each intersection and information that identifies road types, will be mainly described. Instead, a travel route generated in the in-vehicle device may be transferred to the terminal device by using the takeover information. The configuration of the second embodiment is substantially the same as the configuration of the first embodiment unless otherwise specified. Like reference numerals as those used in the first embodiment are where necessary assigned to substantially the same components as the components of the first embodiment, and the description thereof is omitted.

Configuration

Initially, the configuration of a terminal device 3 and in-vehicle device 4 that function as a takeover information transmission system 300 according to the present embodiment will be described. FIG. 5 is a block diagram that illustrates the terminal device and the in-vehicle device according to the embodiment of the invention.

Configuration—Terminal Device

First, the configuration of the terminal device 3 will be described. As shown in FIG. 5, the terminal device 3 is an information terminal or a takeover information transmission device. The terminal device 3 roughly includes the communication unit 11, the touch panel 12, the display 13, the current position detection unit 14, the data recording unit 35 and the control unit 36.

Configuration—Terminal Device—Data Recording Unit

The data recording unit 35 includes a takeover information DB 352. The takeover information DB 352 is a takeover information storage means that stores takeover information. The takeover information is information for transferring a first travel route to the in-vehicle device 4 as a second travel route, and is information including information of only part of the entire information that identifies all the first travel route. The takeover information is, for example, information that identifies intersections, information that identifies an approach direction to or an exit direction from each intersection, information that identifies road types, and the like. This takeover information has a similar configuration to the takeover information that is stored in the takeover information DB 152 shown in FIG. 1, and is information that contains pieces of information corresponding to the items shown in FIG. 2 for each intersection in a travel route.

Configuration—Terminal Device—Control Unit

Referring back to FIG. 5, the control unit 36 is a control means that controls the terminal device 3, and functionally conceptually includes a takeover information acquisition unit 362 and a takeover information transmission unit 363. The takeover information acquisition unit 362 is a takeover information acquisition means that acquires takeover information for transferring a first travel route, on which the terminal device 3 provides guidance, to the in-vehicle device 4 different from the terminal device 3 as a second travel route on the basis of information pertaining to the first travel route. The takeover information transmission unit 363 is a takeover information transmission means that transmits takeover information acquired by the takeover information acquisition unit 362. Processes that are executed by these units of the control unit 36 will be described later.

Configuration—in-Vehicle Device

Next, the configuration of the in-vehicle device 4 will be described. As shown in FIG. 5, the in-vehicle device 4 is an information terminal or a takeover information transmission device. The in-vehicle device 4 roughly includes the communication unit 21, the touch panel 22, the display 23, the current position detection unit 24, the data recording unit 45 and the control unit 46.

Configuration—in-Vehicle Device—Data Recording Unit

The data recording unit 45 includes a takeover information DB 452. The configuration of the takeover information DB 452 is similar to the configuration of the takeover information DB 352.

Configuration—in-Vehicle Device—Control Unit

The control unit 46 functionally conceptually includes a takeover information acquisition unit 462 and a takeover information transmission unit 463. The configuration of each of these units is similar to the configuration of each of the units of the control unit 36.

Process

Figure 6:
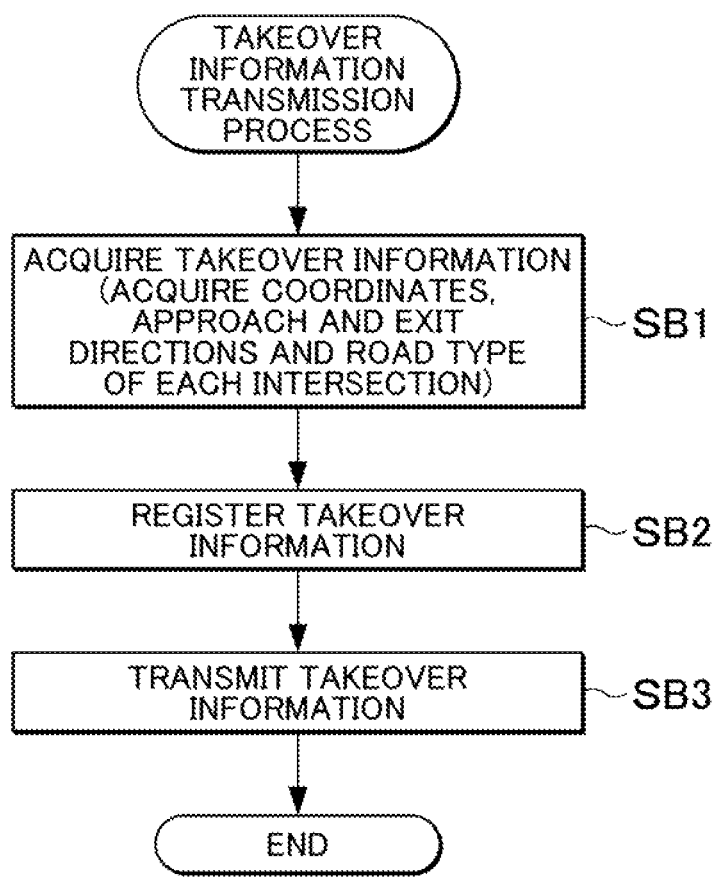
FIG. 6 is a flowchart of a takeover information transmission process.

Next, the takeover information transmission process that is executed by the terminal device 3 of the thus configured takeover information transmission system 300 will be described. FIG. 6 is a flowchart of the takeover information transmission process.

Initially, as shown in FIG. 6, in SB1, the takeover information acquisition unit 362 of the terminal device 3 acquires the takeover information. Specifically, all the intersections in the first travel route generated by the route generation unit 261 are identified, then the position of each of all the identified intersections, the orientation of each of the approach road and the exit road to and from each of all the identified intersections and the road type of each of the approach road and exit road to or from each intersection (hereinafter, matters pertaining to the intersection) are identified, and these identified results are acquired as the takeover information. More specifically, in acquiring the takeover information, initially, the takeover information acquisition unit 362 identifies the intersection closest to the departure place in the first travel route, identifies the above-described matters pertaining to the intersection for the identified intersection, and acquires the identified results as the takeover information. These processes are sequentially executed from the departure place side toward the destination side until the vehicle reaches the branching point closest to the destination. Any technique may be used as a technique for identifying intersections. For example, a known technique for identifying a point at which three or more roads are intersecting as an intersection by using link data and node data may be used. Any technique may be used as a technique for identifying matters pertaining to the intersection. For example, a known technique for identification by using link data and node data may be used. For example, the positions of the branching points J1 to J4 shown in FIG. 4 are identified as the positions of intersections, the orientation and road type of each of the approach road and the exit road to and from each of the branching points J1 to J4 are identified, and these identified results are acquired as the takeover information.

Referring back to FIG. 5, in SB2, the takeover information acquisition unit 362 of the terminal device 3 executes a similar process to that of SA2 in FIG. 3. After that, in SB3 in FIG. 5, the takeover information transmission unit 363 of the terminal device 3 executes a similar process to that of SA3 in FIG. 3.

On the other hand, the in-vehicle device 4 that has received the takeover information and the generation information transmitted in SB3 in FIG. 5, as well as the in-vehicle device 2 shown in FIG. 1, generates the second travel route, and performs guidance by displaying the generated second travel route on the display 23.

Advantageous Effect of Second Embodiment

In this way, according to the present embodiment, for example, by using the information that identifies intersections as the takeover information, it is possible to reflect the information that identifies the intersections pertaining to the first travel route along which guidance is performed. Therefore, it is possible to improve the reproducibility of the first travel route on which the terminal device 3 provides guidance as the second travel route in the in-vehicle device 4.

Third Embodiment

Next, the third embodiment will be described. In this third embodiment, the case where a center device acquires takeover information on the basis of the version of map information of the terminal device and the version of map information of the in-vehicle device and then the travel route generated in the terminal device is transferred to the in-vehicle device by using the acquired takeover information will be mainly described. Instead, the travel route generated in the in-vehicle device may be transferred to the terminal device. The configuration of the third embodiment is substantially the same as the configuration of the first embodiment unless otherwise specified. Like reference numerals as those used in the first embodiment are where necessary assigned to substantially the same configuration as the configuration of the first embodiment, and the description thereof is omitted.

Configuration

Initially, the configurations of a terminal device 5, center device 6 and in-vehicle device 7 that function as a takeover information transmission system 500 according to the present embodiment will be described. FIG. 7 is a block diagram that illustrates the terminal device, the center device and the in-vehicle device according to the embodiment of the invention.

Configuration—Terminal Device

First, the configuration of the terminal device 5 will be described. As shown in FIG. 7, the terminal device 5 is an information terminal or a takeover information transmission device. The terminal device 5 roughly includes a communication unit 51, the touch panel 12, the display 13, the current position detection unit 14, the data recording unit 15 and the control unit 56.

Configuration—Terminal Device—Communication Unit

The communication unit 51 is a communication means that carries out communication with the center device 6 via a network. The specific configuration of the communication unit 51 is similar to the configuration of the communication unit 11 shown in FIG. 1.

Configuration—Terminal Device—Control Unit

Referring back to FIG. 7, the control unit 56 functionally conceptually includes a takeover information acquisition unit 562 and a takeover information transmission unit 563. The takeover information acquisition unit 562 is a takeover information acquisition means that acquires takeover information for having the in-vehicle device 7 different from the terminal device 5 take over a first travel route as a second travel route on the basis of information pertaining to the first travel route along which the terminal device 5 performs guidance. The takeover information transmission unit 563 is a takeover information transmission means that transmits takeover information acquired by the takeover information acquisition unit 562. Processes that are executed by these units of the control unit 56 will be described later.

Configuration—Center Device

Next, the configuration of the center device 6 will be described. As shown in FIG. 7, the center device 6 is an information terminal or a takeover information transmission device, and is a device that transmits information to the in-vehicle device 7 (described later). The center device 6 roughly includes a communication unit 61, the data recording unit 65 and the control unit 66.

Configuration—Center Device—Communication Unit

The communication unit 61 is a communication means that carries out communication with the terminal device 5 and the in-vehicle device 7 via a network. The specific configuration of the communication unit 61 is similar to the configuration of the communication unit 51.

Configuration—Center Device—Data Recording Unit

The data recording unit 65 includes a takeover information DB 652 and a device information DB 653.

The takeover information DB 652 is a takeover information storage means that stores center takeover information. The center takeover information is takeover information that is stored in the center device 6, and is information for having the in-vehicle device 7 take over a first travel route as a second travel route. The center takeover information is information including information of only part of the entire information that identifies all the first travel route. The center takeover information is, for example, information that identifies branching guide points, information that identifies an approach direction or exit direction at each branching guide point, information that identifies road types, and information containing link IDs. FIG. 8 is a view that illustrates the center takeover information. As shown in FIG. 8, the center takeover information is configured such that the item "SOURCE DEVICE", the item "DESTINATION DEVICE", the item "DEPARTURE PLACE", the item "DESTINATION", the item "POSITION", the item "APPROACH ROAD", the item "EXIT ROAD", and the item "LINK ID" are associated with pieces of information corresponding to the items. The information corresponding to the item "SOURCE DEVICE" is the device identification information (hereinafter, device ID) of a generation source device for the first travel route (in FIG. 8, for example, UID010, and the like). UID010 in FIG. 8 indicates the device ID of the terminal device 5. UID001 indicates the device ID of the in-vehicle device 7. When there can be a takeover destination device or takeover source device other than these terminal device 5 and in-vehicle device 7, the device ID of such a device may also be stored. UID002 indicates the device ID of such a device. The information corresponding to the item "DESTINATION DEVICE" is the device ID of the takeover destination device (in FIG. 8, for example, UID001, UID002, and the like). The information corresponding to the item "DEPARTURE PLACE" is information that identifies the departure place of the first travel route (in FIG. 8, latitude and longitude coordinates, for example, 34 degrees, 55 minutes and 43 seconds, 137 degrees, 11 minutes and 50 seconds, and the like). The information corresponding to the item "DESTINATION" is information that identifies the destination of the first travel route (in FIG. 8, latitude and longitude coordinates, for example, 34 degrees, 56 minutes and 40 seconds, 137 degrees, 11 minutes and 50 seconds, and the like). The pieces of information corresponding to the item "POSITION", the item "APPROACH ROAD" and the item "EXIT ROAD" are similar pieces of information to the pieces of information corresponding to the same-name items in FIG. 2. The information corresponding to the item "LINK ID" is all the link IDs corresponding to the first travel route (in FIG. 8, for example, LID005, LID003, LID002, LID001, LID009, and the like).

Referring back to FIG. 7, the device information DB 653 is a device information storage device that stores device information. The device information is information for identifying the terminal device 5 and the in-vehicle device 7 (when there can be a takeover destination device or a takeover source device other than the terminal device 5 and the in-vehicle device 7, such a device is further included, and the same applies to the following description). The device information is specifically information that identifies the version of map information that is stored in each of the terminal device 5 and the in-vehicle device 7. FIG. 9 is a view that illustrates device information. As shown in FIG. 9, the device information is configured such that the item "DEVICE ID" and the item "MAP VERSION" are associated with pieces of information corresponding to the items. The information corresponding to the item "DEVICE ID" is the device IDs of the terminal device 5 and in-vehicle device 7 (in FIG. 9, for example, UID001, UID002, UID010, and the like). The information corresponding to the item "MAP VERSION" is information that identifies the version of map information stored in each of the terminal device 5 and the in-vehicle device 7 (in FIG. 9, VER5, and the like). Such pieces of device information in the device information DB 653 are allowed to be acquired by any method, and are, for example, recorded by reflecting the version of map information that each of the terminal device 5 and the in-vehicle device 7 transmits to the center device 6 in response to a version request from the center device 6 at intervals of a predetermined time.

Configuration—Center Device—Control Unit

Referring back to FIG. 7, the control unit 66 functionally conceptually includes a takeover information acquisition unit 662 and a takeover information transmission unit 663. The takeover information acquisition unit 662 is a takeover information acquisition means that acquires takeover information for having the in-vehicle device 7 different from the terminal device 5 take over a first travel route as a second travel route on the basis of information pertaining to the first travel route along which the terminal device 5 performs guidance. The takeover information transmission unit 663 is a takeover information transmission means that transmits takeover information acquired by the takeover information acquisition unit 662.

Configuration—in-Vehicle Device

Next, the configuration of the in-vehicle device 7 will be described. As shown in FIG. 7, the in-vehicle device 7 is an information terminal or a takeover information transmission device. The in-vehicle device 7 roughly includes a communication unit 71, the touch panel 22, the display 23, the current position detection unit 24, the data recording unit 25 and the control unit 76.

Configuration—in-Vehicle Device—Communication Unit

The communication unit 71 is a communication means that carries out communication with the center device 6 via a network. The specific configuration of the communication unit 71 is similar to the configuration of the communication unit 51.

Configuration—in-Vehicle Device—Control Unit

The control unit 76 functionally conceptually includes a route generation unit 761. The route generation unit 761 is a route generation means that generates a second travel route on the basis of the map information in the map information DB 251 and the takeover information received from the center device 6 with a known generation technique.

Process

Next, the process that is executed by the thus configured takeover information transmission system 500 will be described. The process that is executed by the takeover information transmission system 500 includes a takeover information transmission process that is executed by the terminal device and a takeover information transmission process that is executed by the center device. Hereinafter, these processes will be described.

Process—Takeover Information Transmission Process that is Executed by Terminal Device The takeover information transmission process that is executed by the terminal device is the process that is executed by the terminal device 5. The takeover information transmission process is specifically the process in which the terminal device 5 acquires the takeover information of the first travel route and transmits the acquired takeover information to the center device 6.

In this process, initially, the takeover information acquisition unit 562 of the terminal device 5 shown in FIG. 7 acquires takeover information for the first travel route generated by the route generation unit 161. Specifically, in acquiring the takeover information, the takeover information acquisition unit 562 acquires the device ID of the generation source device for the first travel route, the device ID of the takeover destination device for the first travel route, the information that identifies the departure place and destination of the first travel route, and all the link IDs (link identification information) corresponding to the first travel route as the takeover information together with the information that is acquired by the takeover information acquisition unit 162 shown in FIG. 1. The device ID of the generation source device for the first travel route is information for uniquely identifying the device that has generated the first travel route, and is information for uniquely identifying the terminal device 5. The device ID of the takeover destination device for the first travel route is information for uniquely identifying the takeover destination device that takes over the first travel route. The device ID of the takeover destination device for the first travel route is specifically information that is set upon reception of user's predetermined operation via the touch panel 12, and is information for uniquely identifying the in-vehicle device 7.

Subsequently, the takeover information transmission unit 563 of the terminal device 5 transmits the takeover information acquired by the takeover information acquisition unit 562 to the center device 6 via the communication unit 51, and then the takeover information transmission process that is executed by the terminal device ends. On the other hand, the center device 6 that has received the takeover information transmitted from the terminal device 5 records the center takeover information shown in FIG. 8, which reflects the received takeover information.

Figure 10:
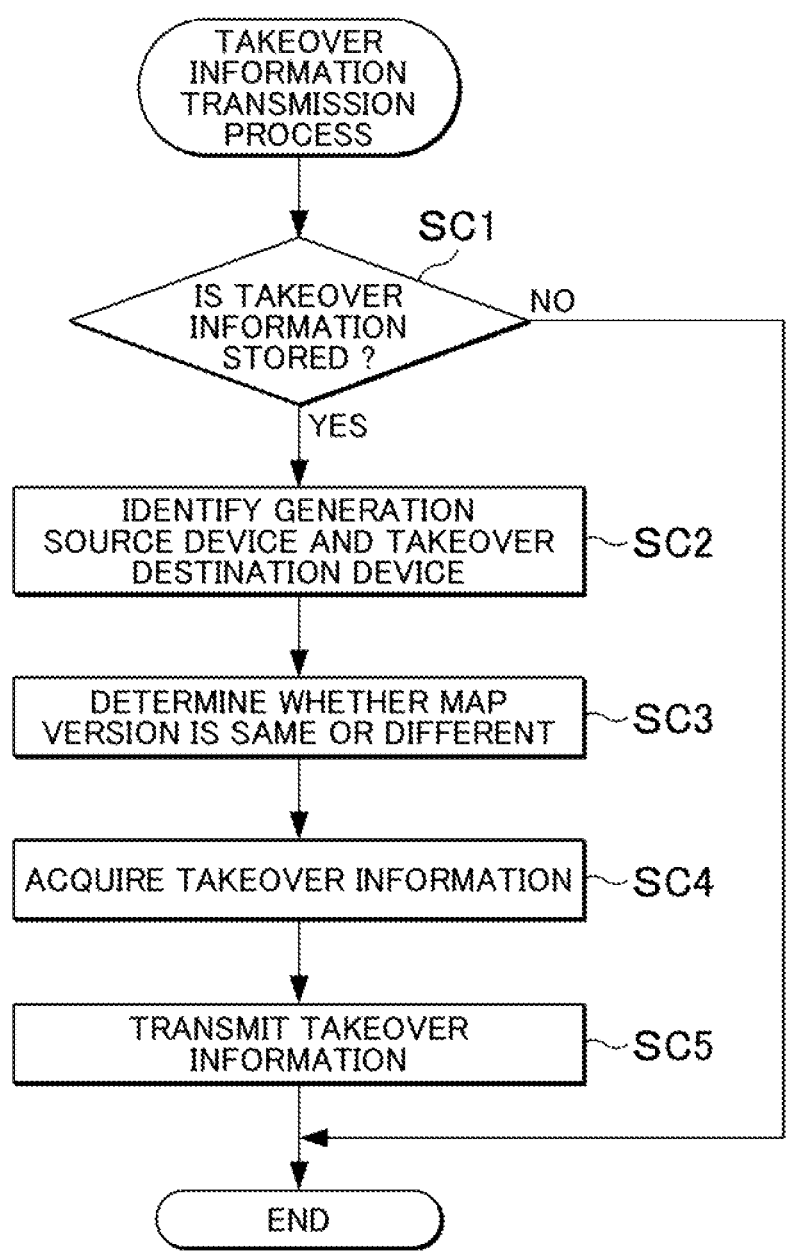
FIG. 10 is a flowchart of a takeover information transmission process.

Process—Takeover Information Transmission Process that is Executed by Center Device The takeover information transmission process that is executed by the center device is the process that is executed by the center device 6. The takeover information transmission process is specifically the process in which the center device 6 acquires the takeover information on the basis of the version of the map information and transmits the acquired takeover information to the in-vehicle device 7. FIG. 10 is a flowchart of the takeover information transmission process that is executed by the center device. The timing at which the takeover information transmission process is executed is any timing after the center takeover information shown in FIG. 8 has been recorded. For example, it is assumed that the takeover information transmission process is started when a takeover information request has been received from the takeover destination device (the in-vehicle device 7 shown in FIG. 7) via the communication unit 61. The description will be made from when the process is started. The takeover information request is a request to transmit the takeover information. The takeover information request is specifically a request containing the device ID (UID001) of the takeover destination device that is requesting the takeover information.

Initially, as shown in FIG. 10, in SC1, the takeover information acquisition unit 662 of the center device 6 determines whether the takeover information corresponding to the takeover information request is stored. Specifically, by consulting the center takeover information shown in FIG. 8, it is determined whether the device ID that is identified by the above-described takeover information request is stored as information corresponding to the item "DESTINATION DEVICE". When the device ID that is identified by the takeover information request is stored, it is determined that the takeover information corresponding to the takeover information request is stored (YES in SC1), and then the process proceeds to SC2. When the device ID that is identified by the takeover information request is not stored, it is determined that the takeover information corresponding to the takeover information request is not stored (NO in SC1), and then the takeover information transmission process is ended. When negative determination is made in SC1, a predetermined message may be transmitted to the in-vehicle device 7 in order to inform that the takeover information is not stored. For example, the device ID contained in the takeover information request is UID001, and the item "DESTINATION DEVICE" in FIG. 8, that is, UID001, is stored, so it is determined that the takeover information is stored.

Referring back to FIG. 10, in SC2, the takeover information acquisition unit 662 of the center device 6 identifies the generation source device for the takeover information determined to be stored in SC1 and the takeover destination device for the takeover information. Specifically, the device corresponding to the device ID of the item "SOURCE DEVICE" in the takeover information determined to be stored in SC1 is identified as the generation source device, and the device corresponding to the device ID of the item "DESTINATION DEVICE" is identified as the takeover destination device. For example, the terminal device 5 corresponding to the item "SOURCE DEVICE"=UID010 in FIG. 8 is identified as the generation source device, and the in-vehicle device 7 corresponding to the item "DESTINATION DEVICE"=UID001 is identified as the takeover destination device.

Referring back to FIG. 10, in SC3, the takeover information acquisition unit 662 of the center device 6 determines whether the version of the stored map information is the same or different between the generation source device and the takeover destination device. Specifically, by consulting the device information shown in FIG. 9, it is determined whether the version of the map information corresponding to the generation source device identified in SC2 and the version of the map information corresponding to the takeover destination device identified in SC2 are the same or different. For example, the item "MAP VERSION" corresponding to the item "DEVICE ID"=UID010 that is the generation source device is VER5, and the item "MAP VERSION" corresponding to the item "DEVICE ID"=UID001 that is the takeover destination device is also VER5, so it is determined that the versions of these pieces of map information are the same.

Referring back to FIG. 10, in SC4, the takeover information acquisition unit 662 of the center device 6 acquires the takeover information. Specifically, information contained in the center takeover information shown in FIG. 8 is acquired as the takeover information on the basis of the identified results of SC2 and the determined results of SC3. More specifically, in acquiring the takeover information, when it is determined in SC3 that the versions of the maps are the same, information corresponding to the item "LINK ID" (hereinafter, link ID information) is acquired as the takeover information from among the pieces of information associated with the takeover destination device and generation source device identified in SC2 on the assumption that it is possible to generate a second travel route through shape matching (described later). On the other hand, when it is determined in SC3 that the versions of the maps are different, information corresponding to the item "DEPARTURE PLACE", the item "DESTINATION", the item "POSITION", the item "APPROACH ROAD" and the item "EXIT ROAD" (hereinafter, branching guide point information) is acquired as the takeover information from among the pieces of information associated with the takeover destination device and generation source device identified in SC2 on the assumption that it is not possible to generate a second travel route through shape matching (described later). For example, because it is determined that the versions of the corresponding pieces of map information are the same, LID005, LID003, LID002, LID001, LID009 corresponding to the item "LINK ID" are acquired.

Referring back to FIG. 10, in SC5, the takeover information acquisition unit 662 of the center device 6 transmits the takeover information. Specifically, the takeover information acquired in SC4 is transmitted to the in-vehicle device 7 via the communication unit 61 shown in FIG. 7. For example, the takeover information that identifies LID005, LID003, LID002, LID001, LID009 is transmitted to the in-vehicle device 7.

On the other hand, the in-vehicle device 7 that has received the takeover information transmitted in SC5 generates the second travel route on the basis of the received takeover information, and the like, and provides guidance by displaying the generated second travel route on the display 23. More specifically, in generating the second travel route, when the link ID information has been received as the takeover information, the second travel route is generated through shape matching; whereas, when the branching guide point information has been received as the takeover information, the second travel route is generated by performing a search as in the case of the route generation unit 261 of the in-vehicle device 2 shown in FIG. 1. The shape matching is a generation technique to generate a travel route without a search. The shape matching is specifically a generation technique to generate a travel route on the basis of the link IDs and the map information in the map information DB 251. More specifically, the shape matching is a generation technique to generate a travel route by connecting links corresponding to link IDs in the map information with each other. In order to use the shape matching, the version of the map information in the generation source device and the version of the map information in the takeover destination device are required to be the same. For example, because the link ID information has been received as the takeover information, the second travel route is generated through shape matching and displayed.

Advantageous Effects of Third Embodiment

In this way, according to the present embodiment, for example, by using the link IDs as the takeover information, it is not required to perform a search in order to provide guidance on the second travel route. Therefore, it is possible to quickly reliably reproduce the first travel route on which the terminal device 5 provides guidance as the second travel route in the in-vehicle device 7.

For example, it is possible to use appropriate takeover information on the basis of whether the version of the map information stored in the terminal device 5 and the version of the map information stored in the in-vehicle device 7 are the same or different, so it is possible to improve takeover accuracy in the in-vehicle device 7.

Alternative Embodiments to Embodiments

The embodiments according to the invention are described; however, specific configurations and means of the invention may be modified or improved as needed within the scope of the technical idea of the invention described in the appended claims. Hereinafter, such alternative embodiments will be described.

Tasks to be Solved and Advantageous Effects of Invention

Initially, the task to be solved by the invention and the advantageous effects of the invention are not limited to those of the above-described embodiments. The task and the advantageous effects may vary depending on an environment in which the invention is implemented or the details of the configuration. Only part of the above-described task may be solved or only part of the above-described advantageous effects may be obtained. For example, even when the convenience of a user in providing route guidance by the use of the takeover information transmission system according to the invention is a comparable level to that of the existing system, but when the convenience of a user in providing route guidance comparable to that of the existing system is provided in a structure different from the existing system, the task of the invention of the present application is solved.

Distribution and Integration

The above-described electrical components are functionally conceptual ones, and are not necessarily required to be physically configured as shown in the drawings. That is, the specific mode of distribution or integration of the units is not limited to the one shown in the drawings. All or part of the units may be functionally or physically distributed or integrated in any units depending on various loads, usage situations, and the like. For example, the terminal device 1 may be distributed to a plurality of devices configured to be communicable with each other, the takeover information acquisition unit 162 may be provided in part of these plurality of devices, and the takeover information transmission unit 163 may be provided in another part of these plurality of devices.

Shapes, Numeric Values, Structures and Time Sequence

The shapes, numeric values or structures of the plurality of components illustrated in the embodiments and the drawings, or the time-sequence correlation among the plurality of components may be modified or improved as needed within the scope of the technical idea of the invention.

Takeover Information

In each of the above-described embodiments, the case where the information that identifies the positions of branching guide points or intersections, the orientation in which the approach road to or the exit road from each branching guide point or each intersection extends and the road types of roads, or link IDs, are acquired and transmitted as the takeover information is described; however, the takeover information is not limited to these pieces of information. For example, in addition to these pieces of information or instead of part of these pieces of information, information as described below may be acquired and transmitted as the takeover information.

For example, a generation condition to generate the first travel route may be acquired and transmitted as the takeover information. Specifically, the generation condition to generate the first travel route that is set upon reception of user's predetermined operation via the touch panel 12 of the terminal device 1 shown in FIG. 1 may be acquired by the takeover information acquisition unit 262, and the takeover information transmission unit 263 may transmit the generation condition. The generation condition to generate the first travel route is a condition to generate a first travel route, and is specifically a condition including a search condition to search for a travel route, such as time priority, ordinary road priority and toll road priority. When configured in this way, it is possible to improve the reproducibility of a first travel route as a second travel route by generating a second travel route under a similar generation condition to a generation condition to generate the first travel route.

For example, information that identifies the positions of the start point and end point of each of the links of the first travel route or the node IDs of all the nodes in the first travel route may be acquired and transmitted as the takeover information.

In the embodiments and alternative embodiments, information of only part of information acquired as the takeover information, information combined as needed or the entire information may be acquired and transmitted as the takeover information.

Technique to Transmit Takeover Information

In the above-described embodiments, the case where all the pieces of acquired takeover information are transmitted and the case where the acquired takeover information is transmitted on the basis of whether the versions of the pieces of map information are the same or different are described; however, transmission of the acquired takeover information is not limited to these configurations. For example, the center device 6 shown in FIG. 7 may transmit the takeover information on the basis of the function of the takeover destination device to provide guidance on a travel route (the function of generating a travel route). Specifically, the item "FUNCTION" is provided in the device information shown in FIG. 9, information that identifies the function of each device to generate a travel route (for example, a travel route is allowed to be generated through any of shape matching and searching, or a travel route is allowed to be generated only through shape matching) may be stored as information corresponding to the item "FUNCTION". The information corresponding to the item "FUNCTION" may be recorded on the basis of a response to a function detail request from each device. The takeover information acquisition unit 662 of the center device 6 may acquire information that enables generation of a second travel route in the takeover destination device from the center takeover information shown in FIG. 8 as the takeover information, and the takeover information transmission unit 263 may transmit the takeover information. In this case, for example, when the function of the takeover destination device allows a travel route to be generated through only shape matching, the link ID information is acquired and transmitted as the takeover information. When configured in this way, it is possible to acquire and transmit appropriate takeover information on the basis of the function of the takeover destination device for providing guidance on a route, so it is possible to improve takeover accuracy.

In the third embodiment, the information that identifies the version of the map information stored in the terminal device 5 and the version of the map information stored in the in-vehicle device 7 is stored in the device information DB 653 of the center device 6. Instead, each of the terminal device 5 and the in-vehicle device 7 may transmit the information that identifies the version of the map information stored in itself to the center device 6 where necessary.

Takeover Source Device and Takeover Destination Device

In each of the above-described embodiments, the case where the takeover source device is the terminal device and the takeover destination device is the in-vehicle device is described; however, the invention is not limited to this configuration. For example, the takeover source device may be the in-vehicle device and the takeover destination device may be the terminal device. Alternatively, the takeover source device and the takeover destination device may be respectively different terminal devices or may be respectively different in-vehicle devices.

Generation Source Device

In each of the above-described embodiments, the case where the generation source device is the terminal device is described; however, the invention is not limited to this configuration. For example, the generation source device may be the center device 6 shown in FIG. 7. In this case, for example, the center device 6 may generate a first travel route in response to a request from the terminal device 5 shown in FIG. 7 and may transmit the generated first travel route to the terminal device 5.

In the above-described third embodiment, the case where the in-vehicle device 7 shown in FIG. 7 generates a second travel route is described; however, the invention is not limited to this configuration. For example, the center device 6 may generate a second travel route on the basis of the takeover information and may transmit the generated second travel route to the in-vehicle device 7. By combining this configuration with the configuration of the generation source device in the above-described alternative embodiment, the center device 6 may generate both first and second travel routes and may transmit both the first and second travel routes to the corresponding devices.

Part of Features and Advantageous Effects of Embodiments

Lastly, part of the features and advantageous effects of each of the embodiments described above are illustrated as follows. However, the features and advantageous effects of each of the embodiments are not limited to those described below. Only part of the following advantageous effects may be obtained when only part of the following features are provided, or an advantageous effect other than the following advantageous effects may be obtained when a feature other than the following features is provided.

A takeover information transmission system according to one first aspect of an embodiment includes takeover information acquisition means for acquiring takeover information for transferring a route, on which a first terminal provides guidance, to a second terminal different from the first terminal on the basis of route information pertaining to the route, and takeover information transmission means for transmitting the takeover information acquired by the takeover information acquisition means.

With the takeover information transmission system according to the above-described first aspect, the takeover information acquisition means acquires the takeover information for causing the second terminal to provide guidance on a route corresponding to the route, on which the first terminal provides guidance, on the basis of the route information pertaining to the above-described route. Therefore, for example, even when the versions of pieces of map information that are respectively used in the first terminal and the second terminal are different from each other, it is possible to transfer the route, on which the first terminal provides guidance, to the second terminal by using the takeover information, so it is possible to improve the convenience of a user for providing guidance on a route.

A takeover information transmission system according to a second aspect of the embodiment is such that, in the takeover information transmission system according to the above-described first aspect, the takeover information acquisition means acquires information that identifies a branching guide point as the takeover information, the branching guide point is a branching point in the route on which the first terminal provides guidance, and the branching guide point is a branching point at which a traveling direction changes.

With the takeover information transmission system according to the above-described second aspect, for example, by using the information that identifies the branching guide point as the takeover information, it is possible to reduce the information content of the takeover information, so it is possible to quickly provide guidance on a route by shortening a transmission time that is taken to transmit the takeover information.

A takeover information transmission system according to a third aspect of the embodiment is such that, in the takeover information transmission system according to the above-described second aspect, the takeover information acquisition means acquires information that identifies an approach direction to or an exit direction from the branching guide point as the takeover information.

With the takeover information transmission system according to the above-described third aspect, for example, by using the information that identifies the approach direction to or the exit direction from the branching guide point as the takeover information, it is possible to reflect the information that identifies the approach direction to or the exit direction from the branching guide point, so it is possible to improve the reproducibility of the route on which the first terminal provides guidance as a route in the second terminal.

A takeover information transmission system according to a fourth aspect of the embodiment is such that, in the takeover information transmission system according to any one of the first aspect to the third aspect, the takeover information acquisition means acquires information that identifies an intersection in the route on which the first terminal provides guidance as the takeover information.

With the takeover information transmission system according to the above-described fourth aspect, for example, by using the information that identifies the intersection as the takeover information, it is possible to reflect the information that identifies the intersection pertaining to the route on which the first terminal provides guidance, so it is possible to improve the reproducibility of the route on which the first terminal provides guidance as a route in the second terminal.

A takeover information transmission system according to a fifth aspect of the embodiment is such that, in the takeover information transmission system according to any one of the first aspect to the fourth aspect, the takeover information acquisition means acquires information that identifies a road type of the route on which the first terminal provides guidance as the takeover information.

With the takeover information transmission system according to the above-described fifth aspect, for example, by using the information that identifies the road type as the takeover information, it is possible to reflect the information that identifies the road type, so it is possible to improve the reproducibility of the route on which the first terminal provides guidance as a route in the second terminal.

A takeover information transmission system according to a sixth aspect of the embodiment is such that, in the takeover information transmission system according to any one of the first aspect to the fifth aspect, the takeover information acquisition means acquires link identification information of the route on which the first terminal provides guidance as the takeover information.

With the takeover information transmission system according to the above-described sixth aspect, for example, by using the link identification information as the takeover information, it is not required to perform a route search in order to provide guidance on a route, so it is possible to quickly reliably reproduce the route on which the first terminal provides guidance as a route in the second terminal.

A takeover information transmission system according to a seventh aspect of the embodiment is such that, in the takeover information transmission system according to any one of the first aspect to the sixth aspect, the takeover information acquisition means acquires information that identifies a generation condition to generate the route on which the first terminal provides guidance as the takeover information.

With the takeover information transmission system according to the above-described seventh aspect, for example, by using the information that identifies the generation condition to generate the route on which the first terminal provides guidance as the takeover information, it is possible to reflect the generation condition used in the first terminal, so it is possible to improve the reproducibility of the route on which the first terminal provides guidance as a route in the second terminal.

A takeover information transmission system according to an eighth aspect of the embodiment is such that, in the takeover information transmission system according to any one of the first aspect to the seventh aspect, the takeover information acquisition means acquires information that identifies a version of map information that is used in the first terminal as the takeover information.

With the takeover information transmission system according to the above-described eighth aspect, for example, by using the information that identifies the version of the map information that is used in the first terminal as the takeover information, the second terminal is allowed to provide guidance on a route in consideration of the version of the map information that is used in the first terminal. Therefore, it is possible to provide appropriate guidance corresponding to the version of the map information, so it is possible to improve guidance accuracy.

A takeover information transmission system according to a ninth aspect of the embodiment is such that, in the takeover information transmission system according to any one of the first aspect to the eighth aspect, the takeover information acquisition means determines whether a version of map information that is used in the first terminal and a version of map information that is used in the second terminal are the same or different, and acquires the takeover information on the basis of the determined results.

With the takeover information transmission system according to the above-described ninth aspect, for example, it is possible to use appropriate takeover information on the basis of whether the versions of the pieces of map information used in the first and second terminals are the same or different, so it is possible to improve takeover accuracy.

A takeover information transmission system according to a tenth aspect of the embodiment is such that, in the takeover information transmission system according to any one of the first aspect to the ninth aspect, the takeover information acquisition means identifies a function of the second terminal for providing guidance on a route and acquires the takeover information on the basis of the identified function.

With the takeover information transmission system according to the above-described tenth aspect, for example, it is possible to use appropriate takeover information on the basis of the function of the second terminal for providing guidance on a route, so it is possible to improve takeover accuracy.

A takeover information transmission device according to an eleventh aspect of the embodiment includes takeover information acquisition means for acquiring takeover information for transferring a route, on which a first terminal provides guidance, to a second terminal different from the first terminal on the basis of route information pertaining to the route, and takeover information transmission means for transmitting the takeover information acquired by the takeover information acquisition means to the second terminal.

With the takeover information transmission device according to the eleventh aspect, the takeover information acquisition means acquires the takeover information for causing the second terminal to provide guidance on a route corresponding to the route, on which the first terminal provides guidance, on the basis of the route information pertaining to the above-described route. Therefore, for example, even when the versions of pieces of map information that are respectively used by the first terminal and the second terminal are different from each other, it is possible to transfer the route, on which the first terminal provides guidance, to the second terminal by using the takeover information, so it is possible to improve the convenience of a user for providing guidance on a route.

An information terminal according to a twelfth aspect of the embodiment includes takeover information acquisition means for acquiring takeover information for transferring a route, on which the information terminal provides guidance, to a different information terminal on the basis of route information pertaining to the route, and takeover information transmission means for transmitting the takeover information acquired by the takeover information acquisition means to the different information terminal.

With the information terminal according to the twelfth aspect, the takeover information acquisition means acquires the takeover information for causing the second terminal to provide guidance on a route corresponding to the route, on which the first terminal provides guidance, on the basis of the route information pertaining to the above-described route. Therefore, for example, even when the versions of pieces of map information that are respectively used by the first terminal and the second terminal are different from each other, it is possible to transfer the route, on which the first terminal provides guidance, to the second terminal by using the takeover information, so it is possible to improve the convenience of a user for providing guidance on a route.

A takeover information transmission method according to a thirteenth aspect of the embodiment includes acquiring, by takeover information acquisition means, takeover information for transferring a route, on which a first terminal provides guidance, to a second terminal different from the first terminal on the basis of route information pertaining to the route, and transmitting, by takeover information transmission means, the acquired takeover information.

With the takeover information transmission method according to the thirteenth aspect, the takeover information for causing the second terminal to provide guidance on a route corresponding to the route, on which the first terminal provides guidance, is acquired on the basis of the route information pertaining to the above-described route. Therefore, for example, even when the versions of pieces of map information that are respectively used in the first terminal and the second terminal are different from each other, it is possible to transfer the route, on which the first terminal provides guidance, to the second terminal by using the takeover information, so it is possible to improve the convenience of a user for providing guidance on a route.

A non-transitory computer-readable recording medium storing a takeover information transmission program according to a fourteenth aspect of the embodiment for causing a computer to execute instructions. The instructions include acquiring takeover information for transferring a route, on which a first terminal provides guidance, to a second terminal different from the first terminal on the basis of route information pertaining to the route, and transmitting the acquired takeover information.

With the non-transitory computer-readable recording medium storing the takeover information transmission program according to the fourteenth aspect, the takeover information for causing the second terminal to provide guidance on a route corresponding to the route, on which the first terminal provides guidance, is acquired on the basis of the route information pertaining to the above-described route. Therefore, for example, even when the versions of pieces of map information that are respectively used in the first terminal and the second terminal are different from each other, it is possible to transfer the route, on which the first terminal provides guidance, to the second terminal by using the takeover information, so it is possible to improve the convenience of a user for providing guidance on a route.

What is claimed is:

1. A takeover information transmission system comprising:
    a processor configured to:
        determine a version of map information used in a first terminal, and a version of map information used in a second terminal;
        determine whether the version of map information used in the first terminal, and the version of map information used in the second terminal are the same or different;
        when the version of map information used in the first terminal is the same as the version of map information used in the second terminal, acquire first takeover information;
        when the version of map information used in the first terminal is different from the version of map information used in the second terminal, acquire second takeover information, the first and second takeover information being information for transferring a reproducible route, which the first terminal provides guidance from, to the second terminal; and
        transmit the acquired takeover information to the second terminal.

2. The takeover information transmission system according to claim 1, wherein the acquired takeover information includes information that identifies a branching guide point in the reproducible route, the branching guide point being a branching point at which a traveling direction changes in the reproducible route.

3. The takeover information transmission system according to claim 2, wherein the acquired takeover information includes information that identifies an approach direction to or an exit direction from the branching guide point in the reproducible route.

4. The takeover information transmission system according to claim 1, wherein the acquired takeover information includes information that identifies an intersection in the reproducible route.

5. The takeover information transmission system according to claim 1, wherein the acquired takeover information includes information that identifies a road type of the reproducible route.

6. The takeover information transmission system according to claim 1, wherein
the first takeover information is the acquired takeover information, and
the first takeover information includes link identification information of the reproducible route.

7. The takeover information transmission system according to claim 1, wherein the acquired takeover information includes information that identifies a generation condition to generate the reproducible route.

8. The takeover information transmission system according to claim 1, wherein the processor is further configured to:
identify a function of the second terminal for providing route guidance, and
acquire the takeover information on the basis of the identified function.

9. The takeover information transmission system according to claim 1, wherein the takeover information includes at least one of: information that identifies a branching guide point, information that identifies an approach direction to or exit direction from the branching guide point, information that identifies an intersection, information that identifies an approach direction to or exit direction from the intersection, information that identifies a road type, link identification information, and information that identifies a route generation condition.

10. A takeover information transmission device comprising:
a network communication interface; and
a processor configured to:
determine a version of map information used in a first terminal, and a version of map information used in a second terminal;
determine whether the version of map information used in the first terminal, and the version of map information used in the second terminal are the same or different;
when the version of map information used in the first terminal is the same as the version of map information used in the second terminal, acquire first takeover information;
when the version of map information used in the first terminal is different from the version of map information used in the second terminal, acquire second takeover information, the first and second takeover information being information for transferring a reproducible route, which the first terminal provides guidance from, to the second terminal; and
transmit, via the network communication interface, the acquired takeover information to the second terminal.

11. An information terminal comprising:
a processor configured to:
determine a version of map information used in the information terminal, and a version of map information used in another information terminal;
determine whether the version of map information used in the information terminal, and the version of map information used in the other information terminal are the same or different;
when the version of map information used in the information terminal is the same as the version of map information used in the other information terminal, acquire first takeover information;
when the version of map information used in the information terminal is different from the version of map information used in the other information terminal, acquire second takeover information, the first and second takeover information being information for transferring a reproducible route, which the information terminal provides guidance from, to the other information terminal; and
transmit the acquired takeover information to the other information terminal.

12. A takeover information transmission method comprising:
determining a version of map information used in a first terminal, and a version of map information used in a second terminal;
determining whether the version of map information used in the first terminal, and the version of map information used in the second terminal are the same or different;
when the version of map information used in the first terminal is the same as the version of map information used in the second terminal, acquiring first takeover information;
when the version of map information used in the first terminal is different from the version of map information used in the second terminal, acquiring second takeover information, the first and second takeover information being information for transferring a reproducible route, which the first terminal provides guidance from, to the second terminal; and
transmitting the acquired takeover information to the second terminal.

13. A non-transitory computer-readable recording medium storing a takeover information transmission program that include computer-executable instructions that, when executed by a computer, cause the computer to:
determine a version of map information used in a first terminal, and a version of map information used in a second terminal;
determine whether the version of map information used in the first terminal, and the version of map information used in the second terminal are the same or different;
when the version of map information used in the first terminal is the same as the version of map information used in the second terminal, acquire first takeover information;
when the version of map information used in the first terminal is different from the version of map information used in the second terminal, acquire second takeover information, the first and second takeover information being information for transferring a reproducible route, which the first terminal provides guidance from, to the second terminal; and
transmit the acquired takeover information to the second terminal.

14. A takeover information transmission system comprising:
a first terminal configured to set a first route in a map contained in first map information, and generate and transmit takeover information for reproducing the first route; and
a second terminal configured to:
receive the takeover information for reproducing the first route that is transmitted from the first terminal,
set, based on the received information for reproducing the first route, a second route in a map contained in second map information, the second route corresponding to a reproduction of the first route, and control a display to display the second route, wherein the type of takeover information received by the second terminal is a first type of takeover information when a version of the first map information used in the first terminal, and a version of the second map information used in the second terminal, are the same, and the type of takeover information received by the second terminal is a second type of takeover information when the version of the first map information used in the first terminal, and the version of the second map information used in the second terminal, are different.

* * * * *